United States Patent
Isaacson (10) Patent No.: US 6,971,699 B2
(45) Date of Patent: Dec. 6, 2005

(54) MODULAR VEHICLE RAIL SYSTEM FOR VEHICLE

(75) Inventor: Mark J. Isaacson, Grosse Pointe Park, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/707,254

(22) Filed: Dec. 1, 2003

(65) Prior Publication Data

US 2005/0116487 A1    Jun. 2, 2005

(51) Int. Cl.[7] ................................................. B60N 3/12
(52) U.S. Cl. ..................... 296/37.8; 296/37.7; 224/311
(58) Field of Search ............................. 296/37.1, 37.7, 296/37.8, 37.18, 37.13; 224/321, 311

(56) References Cited

U.S. PATENT DOCUMENTS

| | | | |
|---|---|---|---|
| 2002/0163219 A1* | 11/2002 | Clark et al. ................. | 296/37.8 |
| 2003/0168875 A1* | 9/2003 | Anderson et al. ........... | 296/37.8 |
| 2004/0084920 A1* | 5/2004 | Trimble et al. ............. | 296/37.8 |

* cited by examiner

Primary Examiner—Lori L. Coletta
(74) Attorney, Agent, or Firm—Gigette M. Bejin; Artz & Artz P.C.

(57) ABSTRACT

A modular vehicle system for a vehicle includes one or more elongated modular members adapted to be coupled to an interior portion of a vehicle. One or more removable articles are configured for attachment to one or more of the members and a utility system provides utilities to the articles. One or more holders are positioned to align with the members and are coupled to the articles for attaching them to one or more of the members. The articles are interchangeable across multiple different vehicles, including different vehicle models and makes.

18 Claims, 5 Drawing Sheets

MODULAR VEHICLE RAIL SYSTEM FOR VEHICLE

BACKGROUND OF INVENTION

The present invention relates to a modular vehicle rail system for a vehicle. More particularly, the present invention relates to a modular vehicle rail system that is adapted to be removeably coupled to an interior portion of a vehicle and is interchangeable across multiple vehicle lines and allows for the transfer of components from one vehicle to another.

Modular storage compartments in the forward portion of vehicles are generally known and include consoles and structures for mounting items such as lamps, small storage compartments and electronic instrumentation such as compasses, temperature displays and clocks. Vehicle systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages.

More recently, a modular system for a vehicle, such as disclosed in U.S. Publication No. 2002/0163219 A1, was developed. The modular system includes one or more elongated members that are adapted to be coupled to an interior portion of the vehicle. The members allow for attachment of one or more removable articles thereto. A utility system is also provided that supplies power to the articles. The system also includes one or more holders that are positioned to align with the member and are coupled to the articles for attaching the articles to one or more of the members.

While the above-described modular system is advantageous, it would be desirable to provide a modular system that allows for interchangeability of articles between multiple different vehicles. It would also be desirable to provide a modular system that can be manufactured for installation into multiple different vehicle models or platforms.

This interchangeability across different vehicle lines, including unrelated vehicle lines would provide substantial cost savings in terms of manufacturing costs, vehicle launch, and vehicle design could be realized. The interchangeability of components or articles would provide increased convenience to the user as well as decreased manufacturing costs.

SUMMARY OF INVENTION

In accordance with the present invention, a modular vehicle system for use on a vehicle is provided. The system includes a plurality of attachment points coupled or otherwise formed in the vehicle interior. The attachment points are intended to releasably receive one or more articles. The attachment points are universal such that they can be readily located in a variety of different vehicles, including different vehicle models and types, which allow commonality of these attachment points across different vehicle lines. Additionally, the removable coupling configuration of the attachment points allows easy interchange ability of the articles from one vehicle or another. It also allows different or additional articles to be attached to the modular system.

Also, in accordance with the present invention, a method of interchanging one or more articles across multiple vehicles is provided. In accordance with the method, a vehicle interior is provided and a modular system is secured to the vehicle interior. The modular system includes a first attachment point that is intended to releasably engage a first article. The modular system includes a second attachment point that is intended to releasably engage a second article. Either the first or second articles can be detached from the modular system and attached to another modular system in a different vehicle. Additionally, a third article can be attached in place of the removed article.

These and other features and advantages of the present invention will become apparent from the following description of the invention, when viewed in accordance with the accompanying drawings and appended claims.

DETAILED DESCRIPTION

Figure 1:
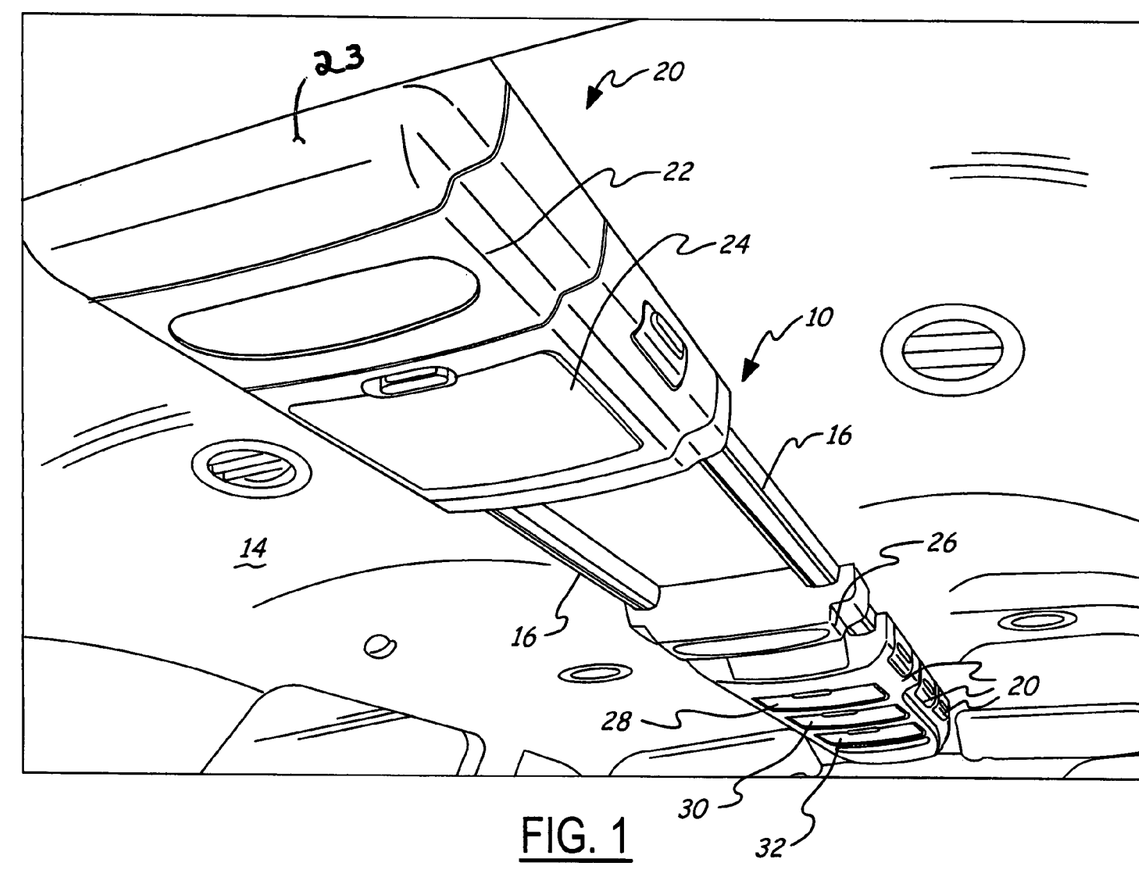
FIG. 1 is perspective view of a modular vehicle system attached to a vehicle interior and including interchangeable mounting members according to one embodiment of the present invention.

Referring now to FIG. 1 which illustrates a modular system 10 in accordance with one embodiment of the present invention. The modular system 10 is intended for a vehicle interior and is secured along an interior panel 14 of the vehicle. The modular system 10 in this embodiment includes a plurality of attachment points located on a pair of receiving members 16 which provide a multitude of attachment points for the articles. The receiving members 16 may comprise a variety of different structures that allow for a virtual unlimited number of attachment points. The modular system 10 is preferably attached to a vehicle roof or headliner. However, it will be understood that the modular system 10 may alternatively be attached to the door, side panel, cover, headliner or other interior structure of the vehicle. The modular system preferably allows for the mounting of the articles 20 along the sides of the vehicle such as door or side panels, or within the interior space of the vehicle such as cargo areas.

The attachment points allow for releasable engagement of the plurality of articles 20 with the receiving members 16. In the embodiment shown in FIG. 1, the articles consist of a light module 22, which is preferably located near the front of the modular system 10. The light module 22 is stationary or fixed, i.e. not releasably engageable with the modular system 10. Alternatively, the light module 22 may be releasably engageable or coupled with the modular system 10. The modular system 10 also includes a first module 24, which may be a display screen. The modular system 10 also includes another light module 26 located in about the middle of the system 10 and a plurality of storage modules 28, 30, 32 located near the rear of the system 10. Each of the modules 24, 26, 28, and 32 are releasably engageable with the system 10 such that they can each be independently and readily detached from their respective attachment points for attachment to a modular system in another vehicle or for detachment and then reattachment at a later time.

It will be understood that the detachable articles 20 can consist of almost an unlimited number of devices to provide a variety of different features to users. For example, the articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, CDs, DVDs, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. The articles 20 may also include handles, brackets, fixtures for mounting racks, cages, or support pillars for optionally receiving members 16 to mount additional articles 20 in a cargo area, lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use. Accordingly, various articles can be mixed and matched into and out of the modular system 10. Additionally, the various articles 20 can be relocated within a given modular system 10.

In one embodiment, the mounting members 16 consist of two generally parallel rails that are oriented in any desired configuration within a vehicle along an interior panel 14 to provide an almost unlimited number of attachment points. It will be understood that while rails are disclosed, a variety of other mounting members 16, such as tracks, channels, holders, bars, rods, poles, or the like can be utilized. The mounting members 16 can be formed with different lengths such that they can be positioned within a variety of different vehicle styles and models. Additionally, the mounting members 16 have a lateral spacing that is generally adjustable to accommodate a variety of different vehicle styles and models. It will be understood that the lateral spacing between the mounting members 16 can be fixed in order to accommodate installation along a plurality of predetermined different vehicle styles and models. In any event, the lateral spacing is selected such that it is suitable for mounting articles 20. One or more positioners 18 may be used to secure the lateral spacing of members 16 for receiving articles 20.

For overhead applications, the members 16 may be oriented longitudinally and centered laterally within the vehicle. However, the members 16 may be located at any lateral position on the interior panel 14 to accommodate mounting of articles 20. In an alternative embodiment, the members 16 may be separated into a forward segment and/or a rearward segment (not shown) for adapting to roof windows or other discontinuities in the roof structures. The members 16 may also be oriented laterally along the interior panel 14 to increase the flexibility and utility of the system for interchangeably receiving the articles 20. In another alternative embodiment, a single member 16 may be used in conjunction with articles 20 that are adapted to selectively and interchangeably engage a single member 16. In a further alternative embodiment, the members 16 may be mounted to pillars (not shown) or other generally vertical support columns within the interior space of a vehicle to provide a system for attaching articles 20. Such pillars may be secured by articles mounted to the members 16 for increased flexibility in attaching articles to the pillar-mounted members. The structural shape of members 16 may vary greatly to accommodate the various articles. For example, the members 16 may be hollow with openings that create an internal passage for routing utility carriers such as wires, cables, fiber optics, etc.

The members 16 are secured to the vehicle in a wide variety of different ways. For example, the ends of the members 16 may be rigidly attached to the forward and rearward edges of the roof frame by welding, brazing or fastening with conventional fasteners. The members 16 may have ends attached directly to the frame, or the members 16 may be attached to the roof frame via fixtures such as brackets. The forward and rearward end connections of members 16 may also be covered by suitable trim components, shown schematically as a bezel or molding 23. The members 16 may have a side profile that is straight, or a side profile that is slightly curved or bowed to correspond with the panel profile. In an alternative embodiment, the members 16 may be secured to door panel structures or to pillars or other support columns within the interior of the vehicle. Such support columns may be permanently fixed to the interior vehicle structure or may be removeably or retractably attached to vehicle structure such as the floor, the roof or the sides of the vehicle to create a modular vehicle rail system for attaching articles within any interior location of a vehicle. Additionally, the members 16 may be formed or disposed in grooves formed in the interior panel 14.

Also shown in FIG. 1 is a utility interface 30 for the system 10 may be included within the interior panel 14 for communicating with passageways through the roof structure and interfacing with members 16. The interface 30 includes a series of ports (e.g. connectors, receptacles, jacks, plugs, or the like) for facilitating the interconnection of conventional utility carriers (e.g. wires, cables, conductors, harnesses, or the like) for delivering utilities (e.g. electrical power, voice and data communication signals, RF transmission signals, instrumentation signals, or the like) between a supply source and the articles 20 mounted to the members 16. The utilities may be routed from the utility supply source (e.g. a battery, antenna, receiver, transmitter, or the like) through utility carriers that interconnect the supply source and the ports provided in the interface 30. The utility interface 30 may be provided in either the forward or rearward portion of the vehicle.

Figure 2:
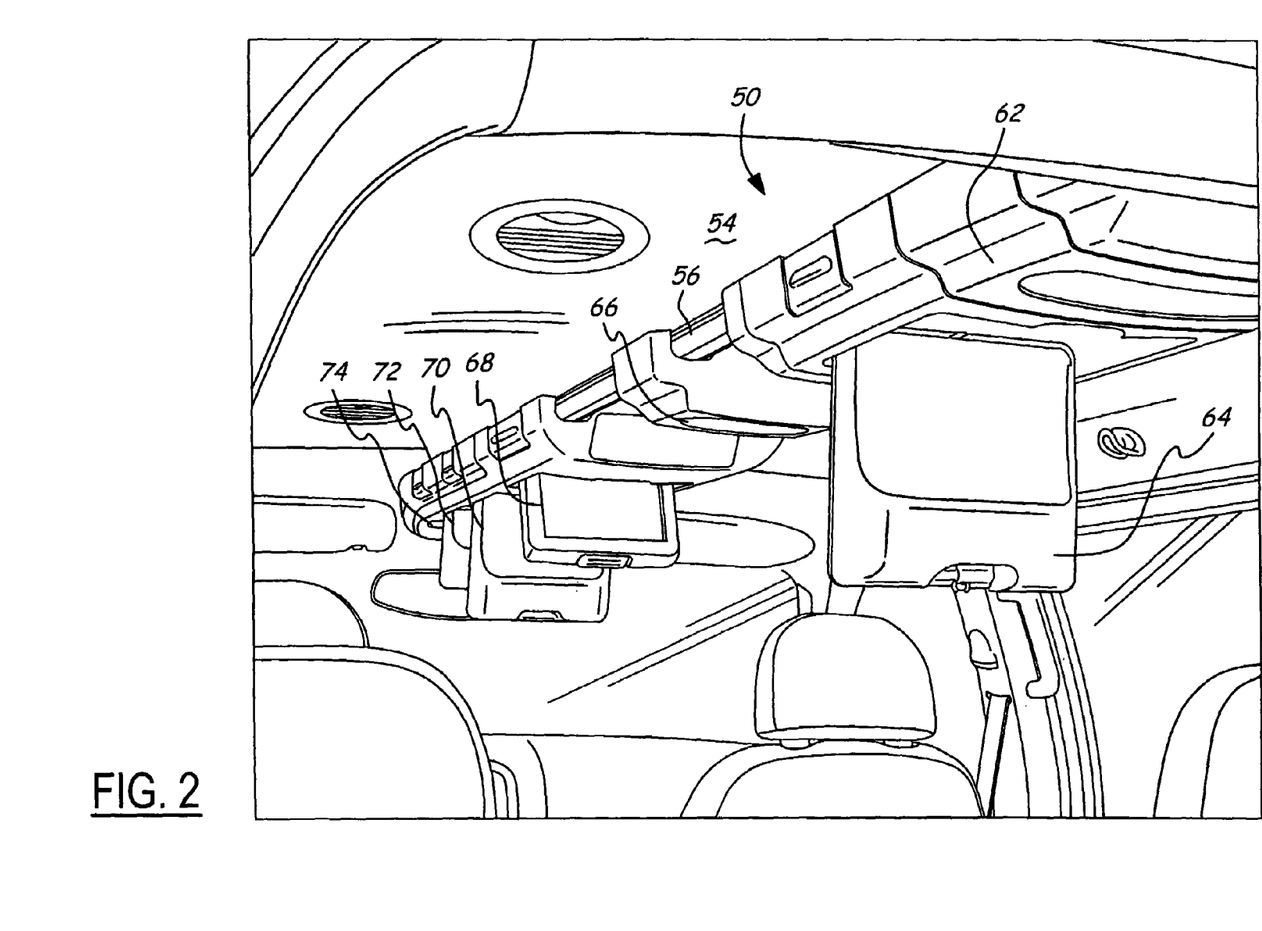
FIG. 2 is a perspective view of a modular vehicle system attached to a vehicle interior and including interchangeable mounting members according to another embodiment of the present invention.

FIG. 2 illustrates another embodiment of a modular system 50 in accordance with the present invention. The modular system 50 is secured or otherwise affixed to an interior panel 54 of the vehicle and includes a plurality of attachment points located on a pair of receiving members 56 for attachment of a variety of articles 60. The receiving members 56 may comprise a variety of different structures that allow for a virtual unlimited number of attachment points and the modular system 50 can be attached to a variety of different interior structures of the vehicle.

The attachment points in the modular system 50 allow for releasable engagement of the plurality of articles 60 with the receiving members 56. In the embodiment shown in FIG. 2, the articles consist of a light module 62, which is preferably located near the front of the modular system 50. The light module 62 is stationary or fixed, i.e. not releasably engageable or coupled with the modular system 50. Alternatively, the light module 62 may be releasably engageable or coupled with the modular system 50. The modular system 50 also includes a first module 64, which may be a display screen. The modular system 50 also includes another light module 66 located in about the middle of the system 50 and a plurality of storage modules 68, 70, 72 located near the rear of the system 50. Another light module 74 is located at the very rear of the module 50. Each of the modules 64, 66, 68, 70, 72, and 74 are releasably engageable with the system 50 such that they can each be independently and readily detached from their respective attachment points for attachment to a modular system in another vehicle or for detachment and then reattachment at a later time. This allows for the articles to be interchangeable by the user long after purchase of the vehicle. It also allows the user to purchase additional articles and add them to the modular system 50 at a later date.

Figure 3:
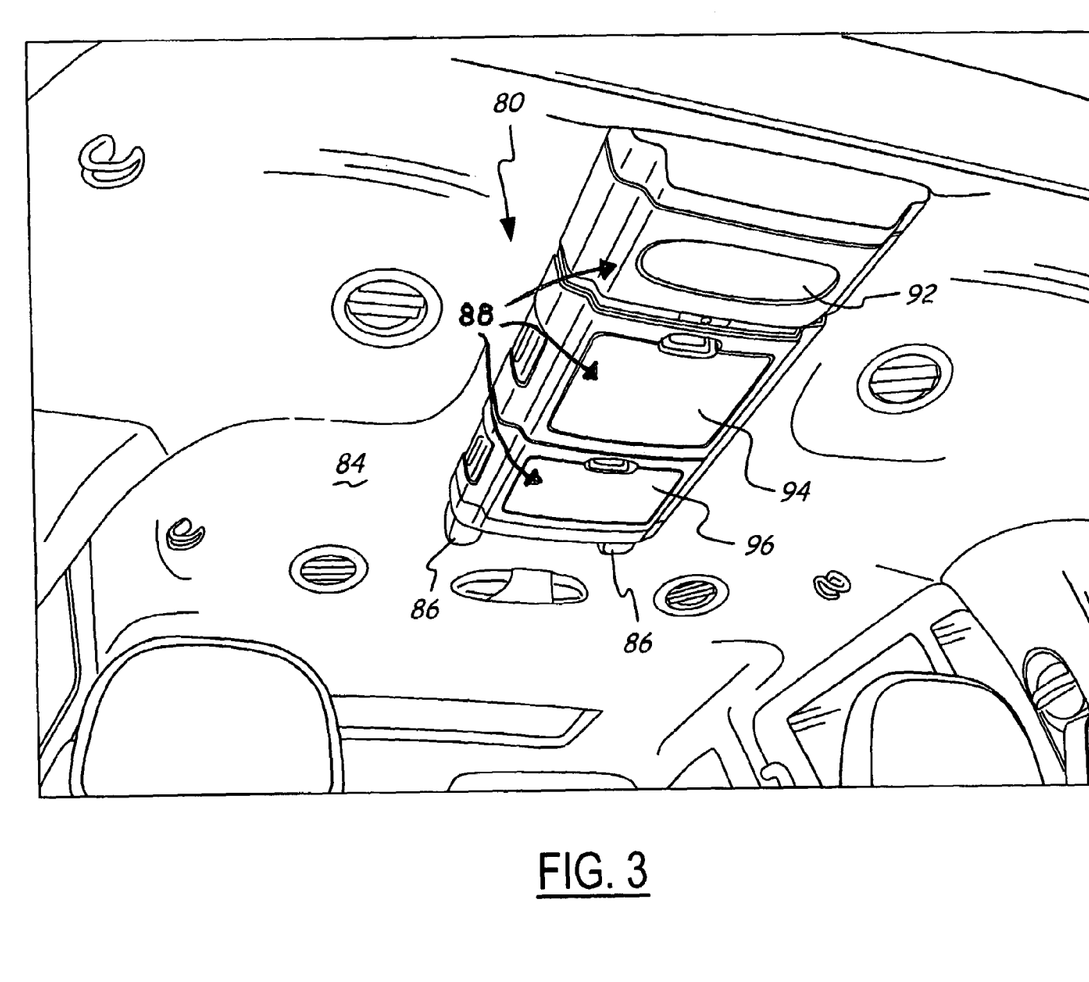
FIG. 3 is a perspective view of a modular vehicle system attached to a vehicle interior and including interchangeable mounting members according to yet another embodiment of the present invention.

FIG. 3 illustrates still another embodiment of a modular system 80 in accordance with the present invention. The modular system 80 is secured or otherwise affixed to an interior panel 84 of the vehicle and includes a plurality of attachment points located on a pair of receiving members 86 for attachment of a variety of articles 88. The receiving members 86 may comprise a variety of different structures that allow for a virtual unlimited number of attachment points and the modular system 80 can be attached to a variety of different interior structures of the vehicle.

The attachment points in the modular system 80 allow for releasable engagement of the plurality of articles 88 with the receiving members 86. In the embodiment shown in FIG. 3, the articles consist of a light module 92, which is preferably located near the front of the modular system 50. The light module 92 is stationary or fixed, i.e. not releasably engageable or coupled with the modular system 80. Alternatively, the light module 92 may be releasably engageable or coupled with the modular system 80. The modular system 80 also includes a first module 94, which may be a display screen. The modular system 80 also includes another storage module 96 located near the rear of the system 80. The module 80 is shorter than the module 80. Each of the modules 94 and 96 are releasably engageable with the system 80 such that they can each be independently and readily detached from their respective attachment points for attachment to a modular system in another vehicle or for detachment and then reattachment at a later time. This allows for the articles to be interchangeable by the user long after purchase of the vehicle. It also allows the user to purchase additional articles and add them to the modular system 80 at a later date.

Figures 4, 5, 6, 7, 8:
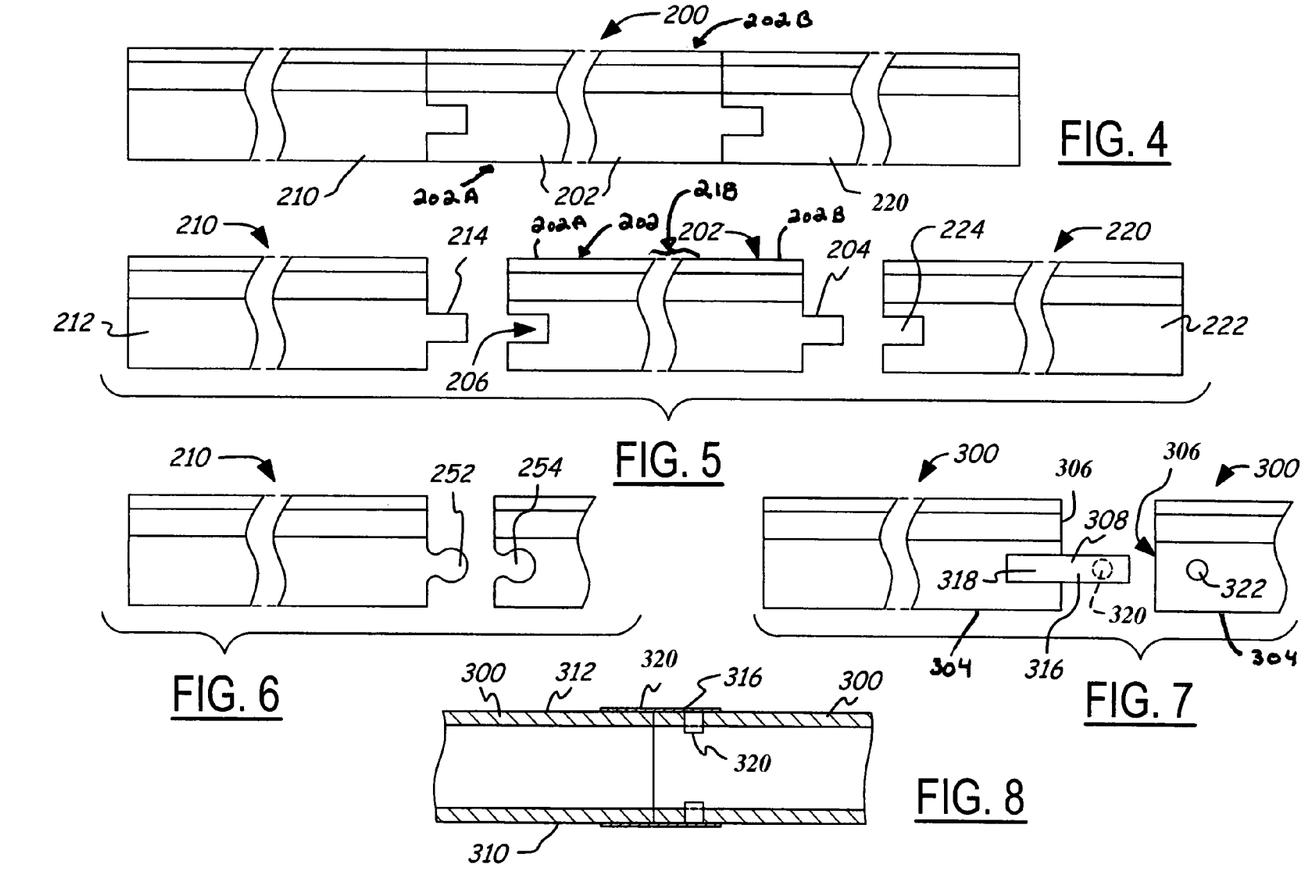
FIG. 4 is a close-up side view of interchangeable mounting members for a modular vehicle rail system according to one embodiment of the present invention.
FIG. 5 is another close-up side view of the interchangeable mounting members of FIG. 4.
FIG. 6 is a close-up side view of the interchangeable mounting members for a modular vehicle rail system according to another embodiment of the present invention.
FIG. 7 is a close-up side view of the interchangeable mounting members of FIG. 6.
FIG. 8 is a side view of the interchangeable mounting member of FIG. 7.

As shown below in FIGS. 4 through 8, the mounting members 16 are formed from smaller, interchangeable modular components that may be interlocked or otherwise coupled to one another to form a mounting member 16 in a wide variety of lengths. Further, because the mounting members 16 are formed separately, the width between a pair of parallel mounting members 16 may be varied to accommodate smaller or larger spaces within the vehicle compartment. In this way, the mounting members 16 can be easily integrated for use in any vehicle line, from the smallest roadster to the largest full-size sports utility vehicle and beyond. In FIGS. 4 through 5, the coupling is accomplished via a male/female mounting arrangement, while in FIGS. 7 and 8 the coupling is accomplished via an exterior coupling device. These are described individually below. However, a variety of other types of mounting arrangements can be utilized.

Referring now to FIGS. 4 through 5, a modular vehicle rail system 200 is shown for forming a pair of modular mounting members 16 having a desired length. Each mounting member 16 is formed by coupling one or more center modular pieces 202 between a pair of respective end pieces 210, 220 as described below. Alternatively, each mounting member may be formed by coupling the respective end pieces 210, 220 without the need for a center modular piece.

As best shown in FIG. 5, the center modular piece 202 is shown having a male portion 204 and a female portion 206 mounted on either end of a center rail section 208. Further, a male modular end piece 210 is shown having an end rail section 212 and a male portion 214. Also, a female modular end piece 220 is shown having an end rail section 222 and a female portion 224. For ease of manufacture and use, the male portion 204 and the female portion 206 of the center modular piece 202 is sized and shaped similarly to the respective female portion 224 and the male portion 214 of the respective end pieces 210, 220. While the shape of the respective male portion 204, 214 is shown as essentially rod-like in FIGS. 4 and 5, it will be understood by those of ordinary skill in the art that the shape of the male portion 204, 214 may take on a wide variety of different shapes that achieve the mechanical strength necessary for its desired application.

To form a modular mounting member 16, two or more center modular pieces 202 are first coupled together by inserting the male portion 204 of one center modular piece 202 within an adjacent female portion 206 of an adjacent center modular piece 202 to form a coupled center section 218. Next, the male portion 214 of the endmost one 202A of the coupled center section 218 is coupled with the corresponding female portion 224 of the female modular end piece 220. Finally, the male portion 214 of the male modular end piece 210 is coupled with a corresponding female portion 206 of the other endmost one 202B of the coupled center module pieces. The process is then repeated for a second mounting member 16. Each modular mounting member 16 is then mounted within the vehicle in a generally parallel manner with the desired width as described above.

Of course, in smaller vehicles or in smaller areas within the same vehicle, the modular mounting members 16 may be formed without the use of any center module pieces 202 or with the use of a single center module piece 202. In the former case, each modular mounting member 16 is formed by inserting the male portion 214 of the male modular end piece 210 within the corresponding female portion 224 of the female modular end piece 220.

As one of ordinary skill will appreciate, the length of each modular mounting member 16 is controlled by two separate factors, including the number of center module sections 202 added between the respective end pieces 210, 220 and by the length of the respective rail sections 202, 210, 220.

In an alternative embodiment, as shown in FIG. 6, a locking mechanism may be used in place of the male/female connecting system of FIGS. 4 through 5 to form each elongate modular mounting member 16. In these systems, the male locking members 252 replace the respective male portions 204, 214, while the female inlet regions 254 replace the female portions 206, 224. To couple the respective pieces together, the respective male portion 252 is inserted within the corresponding inlet region 254 to form the elongated modular mounting members 16 having the desired length. The male locking member 252, when inserted within the respective female inlet region 254, cannot be removed in a direction along the length of the rail section 212, whereas the male portions 204, 214 of FIGS. 4 through 5 may be removed in this direction. In other words, the male locking member 252 is locked within the female inlet region 254 in the direction defined by the rail member (i.e. along the axial length of the rail member 212). The shape of the male locking members 254 may take on many shapes, and is formed to match the shape of the respective inlet regions 256 so that the respective pieces are "locked" together along the length of the member 16.

Referring now to FIGS. 7 and 8, a single modular piece 300 having no female or male portion replaces the respective end and center modular pieces of FIGS. 2 and 4 through 6. The modular piece 300 includes a rail region extending along a bottom parallel side surface 304 having a pair of perpendicular side surfaces 306 running perpendicular to the length of the bottom parallel side surface 304. The modular pieces 300 are placed end to end such that the perpendicular side surfaces 304 of adjacent pieces 300 abut, therein forming a continuous rail region extending along the bottom length of the formed mounting member 16. A coupler 308 is used to couple together two adjacent modular pieces 300.

As best shown in FIG. 8, the coupler 308 has an affixed region 318 that is affixed to each of the pieces" 300 parallel side surfaces, here a front surface 310 and a rear surface 312, in a manner well known to those of ordinary skill in the art. For example, the affixed region 318 could be secured to the parallel front surface 310 using either an adhesive, weld, or rivet. The coupler 308 consists of a flexible middle region 316 contained between the affixed region 318 and a dowel portion 320 that extends along the length of the respective side surface 308, 310 beyond the perpendicular side surface 306.

Opposite the coupler 308 along the same respective side surface 308, 310 is an inlet region 322. The inlet region 322 is shaped to accept the dowel portion 320 of the coupler 308 of an adjacent modular piece 300 to couple together the two respective modular pieces 300, therein forming an elongate member 16.

To couple together the two modular pieces, the flexible middle region 316 of the couplers 308 of one of the modular pieces 300 is flexed upwardly away from the respective coupled front and rear surfaces 310, 312. The adjacent modular piece 300 is positioned such that the respective perpendicular side surfaces 304 of each piece 300 substantially abut. The middle region 316 of each coupler 308 is then unflexed such that the dowel portion 320 is inserted within the respective inlet regions 322, therein forming an elongate modular member 16. Additional modular pieces 300 may be coupled in the same manner to extend the elongate modular member 16 to the desired length. Of course, as one of ordinary skill will recognize, a single end piece (not shown) may be formed without the coupler 308 because it has no adjacent modular piece with which to be coupled.

Figure 9:
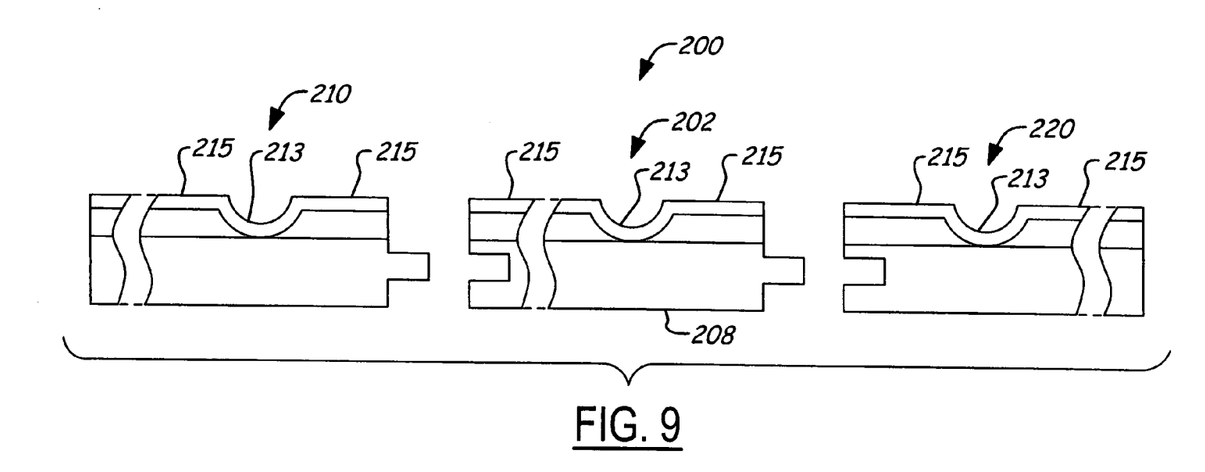
FIG. 9 is a close-up side view of the interchangeable mounting members for a modular vehicle rail system according to another embodiment of the present invention.

In another alternative embodiment, as shown in FIG. 9, any or all of the module mounting members 202, 210, 220 of FIG. 4, for example, may be formed with an inlet region 213 extending between two outer flat regions 215. These inlet regions 213 allow articles 20 having smaller widths to be accommodated on the respective mounting member 202, 210, 220. The inlet region 213 preferably slopes gently inward in a generally arc shaped manner, thereby allowing an infinite number of potential widths smaller than the width of members 202, 210, 220 without these regions 213. In an alternative embodiment (not shown), the inlet region could slope downwardly to a generally flat central region, which extends parallel to the outer flat regions 215 along its length. In this way, two or more articles 20 having similar width may be coupled within the flat central region. Of course, as one of skill would recognize, a potentially infinite array of shapes may be used to form the inlet regions, and thus the examples described above are not intended to be limiting to the described shapes.

Because the male 204, 214 and female portions 206, 224 of the respective members 202, 210, 220 are sized similarly to the male and female portions as in FIG. 4, and because the widths of the outer flat regions 215 are similar to the widths of the mounting members of FIG. 4–8, it is intended that these modified mounting members 202, 210, 220 may be coupled into modular vehicle rail systems 200 having mounting members 202, 210, 220 without the respective inlet regions 213.

Figure 10:
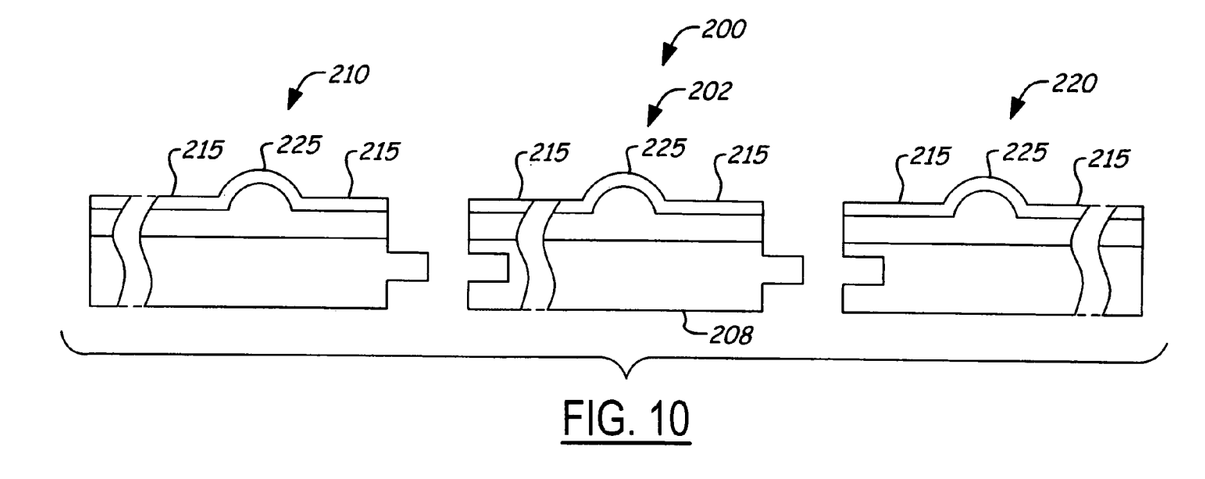
FIG. 10 is a close-up side view of the interchangeable mounting members for a modular vehicle rail system according to another embodiment of the present invention.

Of course, as shown in FIG. 10, as one of ordinary skill would appreciate, modified mounting members 202, 210, 220 may also be formed having an outwardly protruding region 225 to accommodate larger width articles. The protruding region 225, shown in FIG. 10 as having a gently sloping arc-shape, may take on a wide variety of other shapes, including having a central flat region, similar to those described in FIG. 9 above. Thus, articles 20 of varying shapes and sizes may be easily coupled to the modular vehicle rail systems 200 by simply interchanging one or more members having inlet 213 or protruding regions 225.

While the inlet region 213 and protruding region 225 of FIGS. 9 and 10 are shown as permanently formed areas, it is contemplated that protruding and inlet regions could be formed from having a selectively adjustable center section. Thus, for example, a single member 202, 210, 220 could have an adjustable center section that could be adjusted from a wider width to a narrower width (i.e. similar to adjusting from a protruding region to an inlet region) or from a narrower width to a wider width. This embodiment may be especially advantageous, in that a vehicle operator may adjust the width of the respective member 202, 210, 220 after the elongate members have been mounted. This allows new, non-standard width articles 20 to be readily accommodated within the vehicle without having to first remove, adjust, and remount one or both of the elongate members.

The embodiments described in FIGS. 9 and 10 thus allow a single modular vehicle rail system 200 to accommodate articles 20 of virtually any width. This offers potential large cost savings in terms of space savings within a vehicle. This also limits costs associated with remanufacturing articles at standard widths to be incorporated in prior art systems having no width flexibility. To form the modular vehicle rail system 200, one simply determines the width of the articles 20 that are to be attached into the modular vehicle rail system 200 and selects the modular pieces, with or without inlet 213 or protruding regions 225, to accommodate these articles 20.

As seen in the present invention, a new and powerful method for forming the elongated modular mounting members 16 easily and efficiently may be realized for use across in a wide variety of vehicles having different shapes and sizes. In the present invention, the same modular mounting members 16 may be used in the smallest vehicles, such as a subcompact car, to the largest of vehicles, such as a full size sports utility vehicle or larger. Similarly, the same modular mounting members 16 may be used in smaller spaces, like door frames, or in larger spaces such as rooftops. By limiting the number of potential different pieces that form the modular mounting members 30, manufacturing cost savings may be realized in terms of raw material and tooling costs. Further, design cost savings may be realized by not having to design individual mounting members 16 that meet the required specifications for the respective vehicle. Finally, by varying the width between the generally parallel mounting members, both in terms of spacing between the members and by incorporating members with inlet or protruding regions, the modular vehicle rail system can be accommodated in the smaller or larger spaces within the vehicle interior and can accommodate articles having varying attachment widths.

It is important to note that the construction and arrangement of the elements of the modular vehicle rail system for a vehicle provided herein is illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, colors, combinations of shapes, etc.) without materially departing from the novel teachings and advantages of the invention. For example, the modular vehicle rail system may be used in the interior of any vehicle (such as an automobile, truck, sport utility vehicle, van, boat, airplane, train, construction or farming equipment, tractor trailer trucks, motor homes and recreational vehicles, etc.). According to other alternative embodiments, the modular vehicle rail system may be used in connection with articles such as camping gear that are designed to adapt to a stationary vehicle environment. Further, it is readily apparent that elongated members may be provided in a wide variety of shapes, sizes, thickness, and engagement profiles and adapted for installation along the roof, floor and sides of a vehicle, or within a cargo area or other suitable location within a vehicle. It is also readily apparent that the articles may be designed with any profile suitable for attaching to one or more members and may be adapted for slideable movement along the members. Accordingly, all such modifications are intended to be within the scope of the invention as defined in the appended claims.

What is claimed is:

1. A method of interchanging vehicle accessories across a variety of different vehicles, including different vehicle models, comprising:
providing a first modular vehicle attachment system located in a first vehicle, said first modular vehicle attachment system configured for attachment to said first vehicle, said first vehicle being of first style and model;
locating a plurality of attachment points along said first modular vehicle attachment system;
coupling a first article to one of said plurality of attachment points;
coupling a second article to another of said plurality of attachment points;
providing a second modular vehicle attachment system located in a second vehicle, said second modular vehicle attachment system configured for attachment to said second vehicle, said second vehicle being of a second style and model and wherein said first style and model is different than said second style and model;
removing said first article from said first modular vehicle attachment system; and
attaching said first article to said second modular vehicle attachment system.

2. The method of claim 1, wherein said first modular vehicle attachment system includes a pair of parallel rails that provide said plurality of attachment points.

3. The method of claim 1, wherein said second modular vehicle attachment system includes a pair of parallel rails that provide said plurality of attachment points.

4. The method of claim 1, wherein said first article is selected from the group of the following: a DVD, storage compartment, power adapters and outlets, visual display screen, or a first aid kit.

5. The method of claim 1, wherein said first modular vehicle system has a different length than said second modular vehicle system.

6. The method of claim 1, wherein said first modular vehicle system further includes a plurality of articles attached to a plurality of said plurality of attachment points.

7. The method of claim 1, wherein said first modular vehicle system is attached to an interior panel of said first vehicle.

8. The method of claim 7, wherein said interior panel constitutes a vehicle headliner.

9. The method of claim 7, wherein said interior panel constitutes a side panel.

10. The method of claim 7, wherein said interior panel constitutes a door panel.

11. A method for releasably attaching articles to a first modular vehicle attachment system and reattaching them to a second modular vehicle attachment system in a different vehicle model, comprising:
coupling the first modular vehicle attachment system to an interior portion of a first vehicle, said first modular vehicle attachment system configured for attachment to said first vehicle, said first vehicle being of first style and model;
providing a plurality of attachment points on the first modular vehicle attachment system;
coupling a first article to one of said plurality of attachment points on the first modular vehicle attachment system;
coupling the second modular vehicle attachment system to an interior portion of a second vehicle, said second modular vehicle attachment system configured for attachment to said second vehicle, said second vehicle being of a second style and model and wherein said first style and model is different than said second style and model;

providing a plurality of attachment points on the second modular vehicle attachment system;

detaching said first article from said one of said plurality of attachment points; and coupling said first article to one of said plurality of attachment points on the second modular vehicle attachment system where said first vehicle and said second vehicle are different vehicle models.

12. The method of claim 11, wherein said first modular vehicle attachment system includes a pair of rails for providing said plurality of attachment points.

13. The method of claim 11, wherein said first article is selected from the group of the following: a DVD, storage compartment, power adapters and outlets, visual display screen, or a first aid kit.

14. The method of claim 11, wherein said first modular vehicle attachment system is secured to an interior panel of said first vehicle.

15. The method of claim 14, wherein said interior panel constitutes a vehicle headliner.

16. The method of claim 14, wherein said interior panel constitutes a side panel.

17. The method of claim 14, wherein said interior panel constitutes a door panel.

18. A method for providing a modular vehicle attachment system that can be utilized in a variety of different vehicles, comprising:

providing a plurality of attachment points on a first modular vehicle attachment system disposed on an interior surface of a first vehicle, said first modular vehicle attachment system configured for attachment to said first vehicle, said first vehicle being of first style and model;

securing a first component to one of said plurality of attachment points on the modular vehicle attachment system;

providing a plurality of attachment points on a second modular vehicle attachment system disposed on an interior surface of a second vehicle, said second modular vehicle attachment system configured for attachment to said second vehicle, said second vehicle being of a second style and model and wherein said first style and model is different than said second style and model;

releasing said first component from said respective attachment points on a first modular vehicle attachment system; and reattaching said first component to said second modular vehicle attachment system.

* * * * *